(12) United States Patent
Duan et al.

(10) Patent No.: US 10,636,550 B2
(45) Date of Patent: Apr. 28, 2020

(54) COMPOSITE THERMISTOR CHIP AND PREPARATION METHOD THEREOF

(71) Applicant: EXSENSE ELECTRONICS TECHNOLOGY CO., LTD., Zhaoqing, Guangdong (CN)

(72) Inventors: Zhaoxiang Duan, Zhaoqing (CN); Jiankai Ye, Zhaoqing (CN); Jun Yang, Zhaoqing (CN); Qixing Bai, Zhaoqing (CN); Limin Tang, Zhaoqing (CN)

(73) Assignee: Exsense Electronics Technology Co., Ltd., Zhaoqing, Guangdong (CN)

( * ) Notice: Subject to any disclaimer, the term of this patent is extended or adjusted under 35 U.S.C. 154(b) by 0 days.

(21) Appl. No.: 16/618,949

(22) PCT Filed: Oct. 31, 2018

(86) PCT No.: PCT/CN2018/112857
§ 371 (c)(1),
(2) Date: Dec. 3, 2019

(87) PCT Pub. No.: WO2019/119981
PCT Pub. Date: Jun. 27, 2019

(65) Prior Publication Data
US 2020/0090840 A1    Mar. 19, 2020

(30) Foreign Application Priority Data

Dec. 20, 2017   (CN) .......................... 2017 1 1380975

(51) Int. Cl.
*H01C 1/142*    (2006.01)
*H01C 7/04*    (2006.01)
(Continued)

(52) U.S. Cl.
CPC ............. *H01C 1/1413* (2013.01); *G01K 7/22* (2013.01); *H01C 1/142* (2013.01); *H01C 7/041* (2013.01); *H01C 7/042* (2013.01); *H01C 17/006* (2013.01)

(58) Field of Classification Search
CPC .... H01C 17/22; H01C 17/232; H01C 17/006; H01C 7/04; H01C 1/1413; H01C 1/142
See application file for complete search history.

(56) References Cited

U.S. PATENT DOCUMENTS 2,868,935 A * 1/1959 Howatt ................... H01C 7/04
338/25
4,677,413 A * 6/1987 Zandman ................. H01C 7/06
338/195
(Continued)

FOREIGN PATENT DOCUMENTS

CN    102052972 A    5/2011
CN    202602265 U    12/2012
(Continued)

*Primary Examiner* — Kyung S Lee
(74) *Attorney, Agent, or Firm* — Muncy, Geissler, Olds & Lowe, P.C.

(57) ABSTRACT

A composite thermistor chip includes a thermosensitive ceramic chip, a metal electrode and a glass glaze resistor, wherein the thermosensitive ceramic chip has a front side and a back side, the metal electrode includes a first terminal electrode, a second terminal electrode and a third electrode layer; the first terminal electrode and the second terminal electrode are respectively arranged at two ends of the front side of the thermosensitive ceramic chip, and the glass glaze resistor is arranged on the front side of the thermosensitive ceramic chip, two ends of the glass glaze resistor are respectively connected to the first terminal electrode and the second terminal electrode; and the back side of the thermosensitive ceramic chip is covered with the third electrode layer.

7 Claims, 6 Drawing Sheets

(51) Int. Cl.
*H01C 1/14* (2006.01)
*G01K 7/22* (2006.01)
*H01C 17/00* (2006.01)

(56) References Cited

U.S. PATENT DOCUMENTS

| | | | | |
|---|---|---|---|---|
| 4,907,341 | A * | 3/1990 | Chapel, Jr. | H01C 17/232 |
| | | | | 219/121.69 |
| 10,527,501 | B2 * | 1/2020 | Matsushita | H01C 7/02 |
| 2005/0200451 | A1 * | 9/2005 | Tsukada | H01C 7/06 |
| | | | | 338/309 |
| 2009/0284342 | A1 * | 11/2009 | Tsukada | H01C 1/012 |
| | | | | 338/314 |
| 2017/0211991 | A1 * | 7/2017 | Chen | G01K 7/16 |

FOREIGN PATENT DOCUMENTS

| | | |
|---|---|---|
| CN | 103632780 A | 3/2014 |
| CN | 103632784 A | 3/2014 |
| CN | 205911101 U | 1/2017 |
| CN | 106370317 A | 2/2017 |
| CN | 108109789 A | 6/2018 |
| JP | H06302406 A | 10/1994 |
| JP | H10294207 A | 11/1998 |

\* cited by examiner

COMPOSITE THERMISTOR CHIP AND PREPARATION METHOD THEREOF

FIELD OF TECHNOLOGY

The invention belongs to the technical field of electronic components, in particular to a composite thermistor chip and a preparation method thereof.

BACKGROUND

With the innovation of electronic products, more and more electronic products have possessed a temperature sensing or detection function, wherein the core component used to fulfill temperature detection is a thermistor chip. Due to the fact that the resistance of the thermistor chips varies with temperature variations, the temperature of a position where the thermistor chips are located can be determined in terms of the resistance of the thermistor chips, so as to fulfill temperature sensing or detection.

FIG. 1 is a structural view of a conventional thermistor chip. As shown in FIG. 1, the conventional thermistor chip includes a thermosensitive ceramic chip 1' and metal electrodes 2' printed on two surfaces of the thermosensitive ceramic chip 1'. As shown in FIG. 2, a method for preparing the conventional thermistor chip includes the steps: preparation of thermosensitive ceramic powder, sintering of a ceramic ingot, slicing, printing of precious metal electrodes, sintering, size calculation and cutting.

As the temperature characteristic curve of the conventional thermistor chip mainly depends on the formula of a thermosensitive ceramic material adopted by the thermistor chip and cannot be modified, different usage requirements and special production requirements cannot be met, and new functions and applications cannot be achieved.

SUMMARY

In view of this, the objective of the invention is to provide a composite thermistor chip which has an adjustable temperature curve and is simple in structure, easy to prepare, and low in cost.

The technical solution adopted by the invention to fulfill the above objective is as follows:

A composite thermistor chip includes a thermosensitive ceramic chip, a metal electrode and a glass glaze resistor, wherein the thermosensitive ceramic chip has a front side and a back side, the metal electrode includes a first terminal electrode and a second terminal electrode, the first terminal electrode and the second terminal electrode are respectively arranged at two ends of either the front side or the back side of the thermosensitive ceramic chip, and the glass glaze resistor is arranged on the front side or the back side of the thermosensitive ceramic chip.

The glass glaze resistor is added to form the novel composite thermistor chip, wherein the glass glaze resistor is made from a material different from that of the thermosensitive ceramic chip, has a small temperature coefficient and can be regarded as a fixed resistor, so that the composite thermistor chip has a temperature curve different from that of the conventional thermistor chip; the temperature curve of the composite thermistor chip not only depends on a formula of a thermosensitive ceramic material adopted by the composite thermistor chip, but also depends on the resistance and position of the glass glaze resistor, as well as the position of the metal electrode, so that the temperature curve of the composite thermistor chip is adjustable, thus, satisfying different usage requirements and special production requirements which cannot be met by conventional thermistor chips.

Furthermore, the metal electrode further includes a third electrode layer; the first terminal electrode, the second terminal electrode, and the glass glaze electrode are all arranged on the front side of the thermosensitive ceramic chip; two ends of the glass glaze resistor are respectively connected to the first terminal electrode and the second terminal electrode; and the back side of the thermosensitive ceramic chip is covered with the third electrode layer. In this case, an equivalent circuit of the composite thermistor chip can be regarded as a circuit structure formed by a fixed resistor and two cascading thermistors connected with the fixed resistor in parallel.

Furthermore, the glass glaze resistor is arranged on the front side of the thermosensitive ceramic chip, and the first terminal electrode and the second terminal electrode are respectively arranged at two ends of the back side of the thermosensitive ceramic chip. In this case, an equivalent circuit of the composite thermistor chip can be regarded as a circuit structure formed by a fixed resistor and two thermistors connected with the fixed resistor in series.

On the whole, the glass glaze resistor serving as a fixed resistor is added to the circuit in series/parallel, so that the temperature curve of the thermosensitive ceramic chip can be greatly changed to obtain different temperature characteristic curves, and new applications and functions are achieved.

Furthermore, the metal electrode is made from a precious metal.

Furthermore, the thermosensitive ceramic chip is made from an NTC thermosensitive ceramic material and is prepared by sintering metal oxides such as the oxide of manganese, cobalt, nickel, copper and iron, etc., and the specific proportion of the NTC thermosensitive ceramic material can be adjusted according to resistance parameter requirements.

Furthermore, the glass glaze resistor is prepared by printing and sintering glass glaze resistor paste on the thermosensitive ceramic chip and is easy to prepare, and the printing form can be adjusted according to actual requirements. The glass glaze resistance paste is a marketable product, which is composed of metal oxide, glass powder and organic binder, and the metal oxide is the oxide of precious metals such as silver, palladium, ruthenium, rhodium, etc.

The invention further provides a preparation method of any one of the composite thermistor chips mentioned above. The preparation method includes the following steps: pressing NTC thermosensitive ceramic powder and then sintering the NTC thermosensitive ceramic powder at a high temperature to form a ceramic ingot, cutting the ceramic ingot into a thermosensitive ceramic substrate, printing a metal electrode layer and glass glaze resistors on the thermosensitive ceramic substrate, then sintering the thermosensitive ceramic substrate at a high temperature, and afterwards, dividing the sintered thermosensitive ceramic substrate to obtain single composite thermistor chips.

Furthermore, the preparation method specifically includes the following steps:

(1) Mixing raw materials according to a conventional NTC thermosensitive ceramic material formula, and then sequentially ball-milling, drying, screening, pre-sintering, grinding, drying and screening the raw materials to prepare NTC thermosensitive ceramic powder for later use;

(2) Placing the prepared NTC thermosensitive ceramic powder into a mold, placing the mold in an isostatic press to press the NTC thermosensitive ceramic powder, taking a formed ceramic ingot out of the mold after pressure relief, then sintering the ceramic ingot at a high temperature, and afterwards, slicing the ceramic ingot to obtain a thermosensitive ceramic substrate:

(3) Printing a metal electrode layer on a surface of the thermosensitive ceramic substrate;

(4) Printing glass glaze resistor pastes on the surface of the thermosensitive ceramic substrate, and conducting sintering at a high temperature after the glass glaze resistor pastes are dried to obtain glass glaze resistors printed on the thermosensitive ceramic substrate; and (5) Conducting laser resistance trimming on the glass glaze resistors, and then dividing the thermosensitive ceramic substrate to obtain single composite thermistor chips.

The preparation method includes few steps and has only one extra step of printing the glass glaze resistors compared with the method for preparing the conventional thermistor chip, thereby being easy to implement and low in preparation cost; and the printing positions of the metal resistor and the glass glaze resistor can be adjusted as needed, so that the composite thermistor chip having a desired resistant-temperature curve is obtained.

Furthermore, in step (2), the NTC thermosensitive ceramic powder is pressed in the isostatic press at a pressure of 200-400 MPa for 10-50 s.

Furthermore, in step (4), sintering is conducted at a high temperature of 800-900° C. for 10-30 min, and the metal electrode layer and the glass glaze resistor pastes are sintered at the same time.

For the sake of a better understanding and implementation, the invention is detailed below in combination with the accompanying drawings.

DETAILED DESCRIPTION

Embodiment 1

Figure 1:
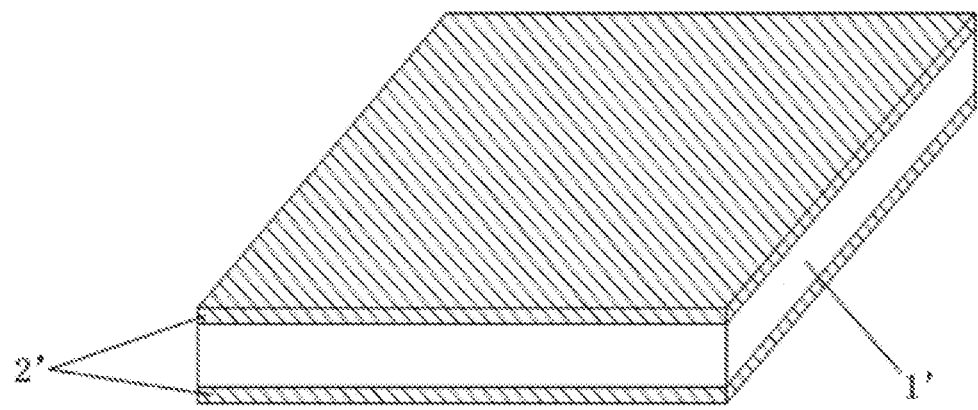
FIG. 1 is a structural view of a conventional thermistor chip.
Figure 2:
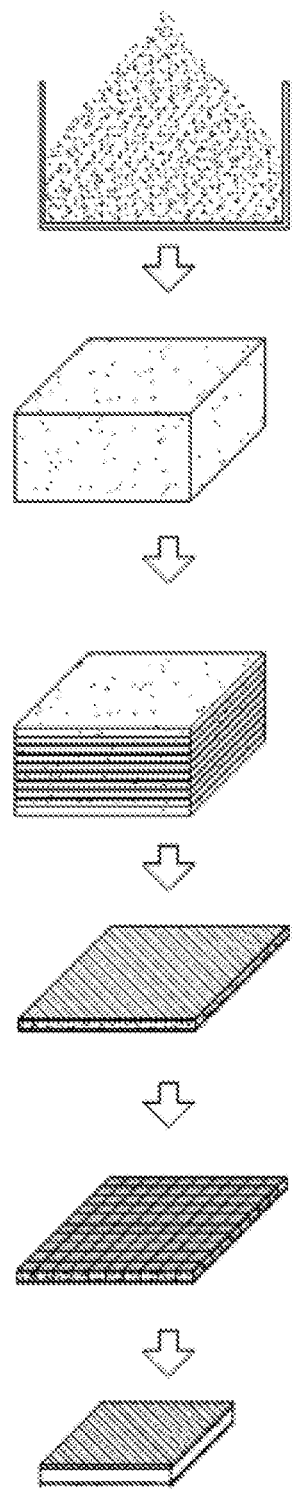
FIG. 2 is a flow diagram of a preparation process of the conventional thermistor chip.
Figure 3:
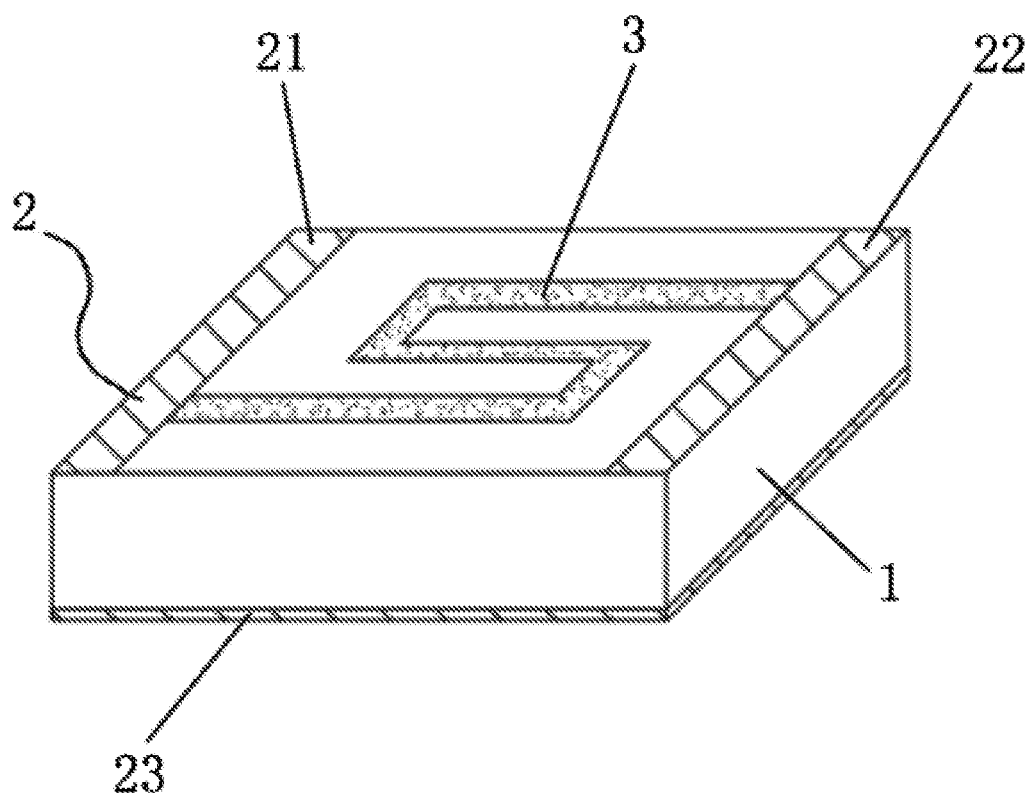
FIG. 3 is a structural view of a composite thermistor chip in Embodiment 1.

Please refer to FIG. 3, which is a structural view of a composite thermistor chip in this embodiment.

In this embodiment, the composite thermistor chip includes a thermosensitive ceramic chip 1, a metal electrode 2, and a glass glaze resistor 3.

The thermosensitive ceramic chip 1 is a rectangular ceramic chip, has two surfaces respectively serving as a front side and a back side, and has a thickness of 200-2000 µm.

The metal electrode 2 includes a first terminal electrode 21, a second terminal electrode 22, and a third electrode layer 23. The first terminal electrode 21 and the second terminal electrode 22 are respectively arranged at two ends of the front side of the thermosensitive ceramic chip 1. The back side of the thermosensitive ceramic chip 1 is covered with the third electrode layer 23.

The glass glaze resistor 3 is arranged on the front side of the thermosensitive ceramic chip 1 and has two ends respectively connected to the first terminal electrode 21 and the second terminal electrode 22. The resistance of the glass glaze resistor 3 is 10 kΩ.

Specifically, the thermosensitive ceramic chip 1 is made from an NTC thermosensitive ceramic material having a material constant of B(25/85)=3435K. The metal electrode 2 is made from a precious metal and is preferably made from sliver. The glass glaze resistor 3 is prepared by printing and sintering glass glaze resistor paste on the thermosensitive ceramic chip 1.

Figure 4:
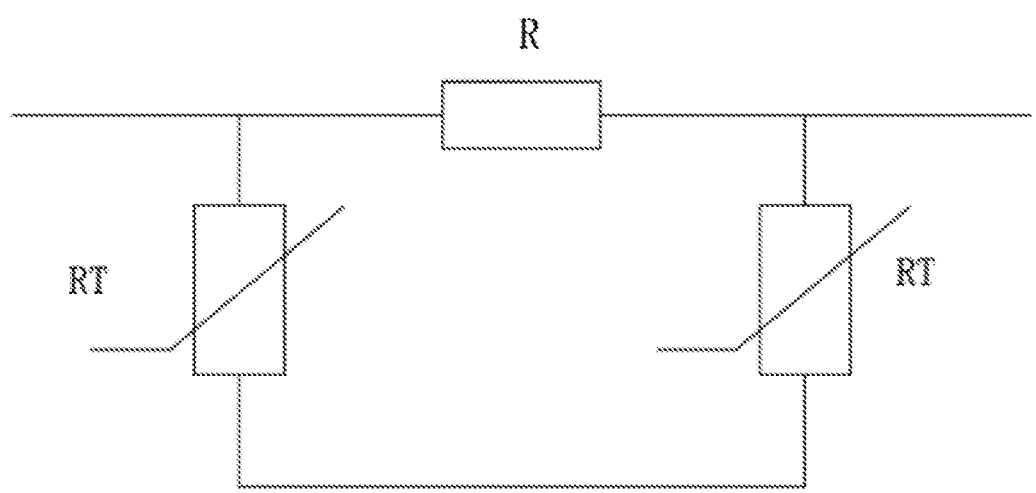
FIG. 4 is an equivalent circuit diagram of the composite thermistor chip in Embodiment 1.

The first terminal electrode 21 and the second terminal electrode 22 respectively serve as a positive electrode and a negative electrode. FIG. 4 is an equivalent circuit diagram of the composite thermistor chip in this embodiment, wherein the glass glaze resistor 3 is equivalent to a fixed resistor R, the thermosensitive ceramic chip 1 is equivalent to two cascading thermistors RT connected with the fixed resistor R in parallel.

Embodiment 2

Figure 5:
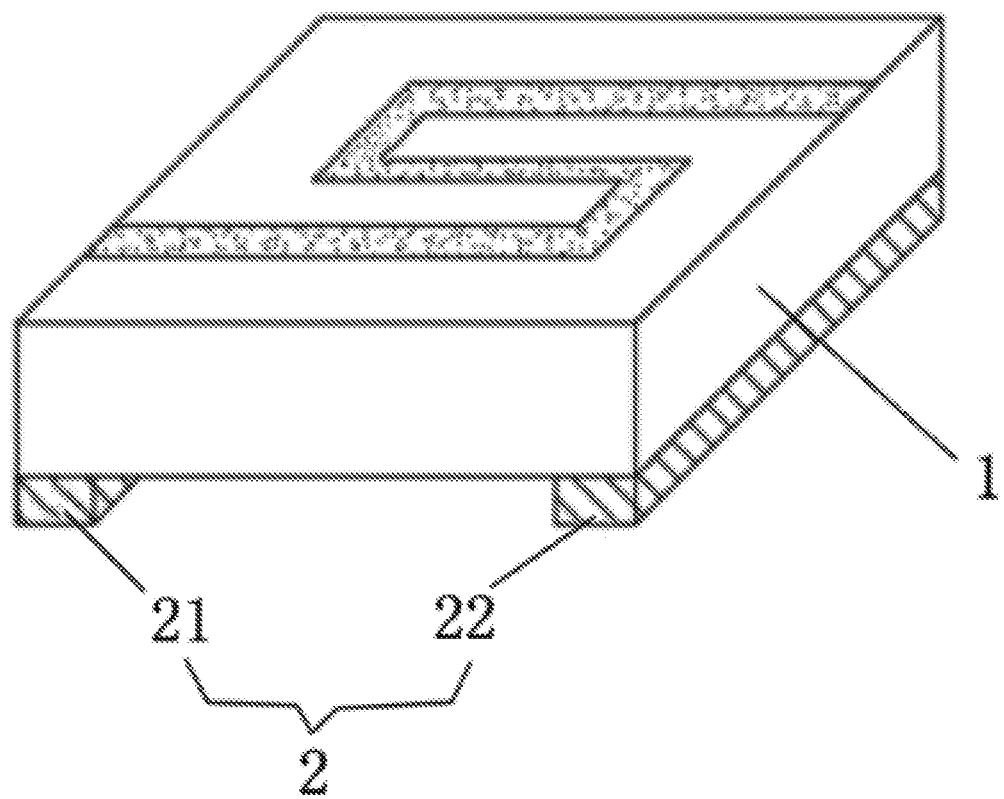
FIG. 5 is a structural view of a composite thermistor chip in Embodiment 2.

Please refer to FIG. 5, which is a structural view of a composite thermistor chip in this embodiment.

In this embodiment, the composite thermistor chip includes a thermosensitive ceramic chip 1, a metal electrode 2, and a glass glaze resistor 3.

The thermosensitive ceramic chip 1 is a rectangular ceramic chip, has two surfaces respectively serving as a front side and a back side, and has a thickness of 200-2000 µm.

The metal electrode 2 includes a first terminal electrode 21 and a second terminal electrode 22. The first terminal electrode 21 and the second terminal electrode 22 are respectively arranged at two ends of the back side of the thermosensitive ceramic chip 1.

The glass glaze resistor 3 is arranged on the front side of the thermosensitive ceramic chip 1. The resistance of the glass glaze resistor 3 is 10 kn.

Specifically, the thermosensitive ceramic chip 1 is made from an NTC thermosensitive ceramic material having a material constant of B(25/85)=3435K. The metal electrode 2 is made from a precious metal and is preferably made from sliver. The glass glaze resistor 3 is prepared by printing and sintering glass glaze resistor paste on the thermosensitive ceramic chip 1.

Figure 6:
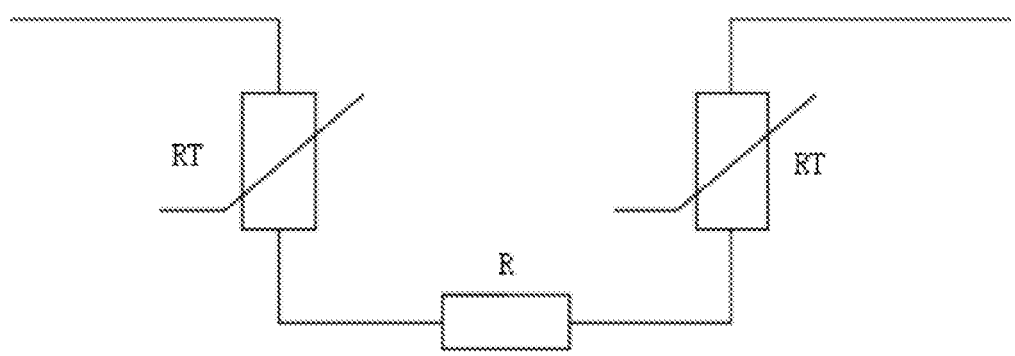
FIG. 6 is an equivalent circuit diagram of the composite thermistor chip in Embodiment 2.

The first terminal electrode 21 and the second terminal electrode 22 respectively serve as a positive electrode and a negative electrode. FIG. 6 is an equivalent circuit diagram of the composite thermistor chip in this embodiment, wherein the glass glaze resistor 3 is equivalent to a fixed resistor R, the thermosensitive ceramic chip 1 is equivalent to two thermistors RT connected with the fixed resistor R in series.

Embodiment 3

Figure 7:
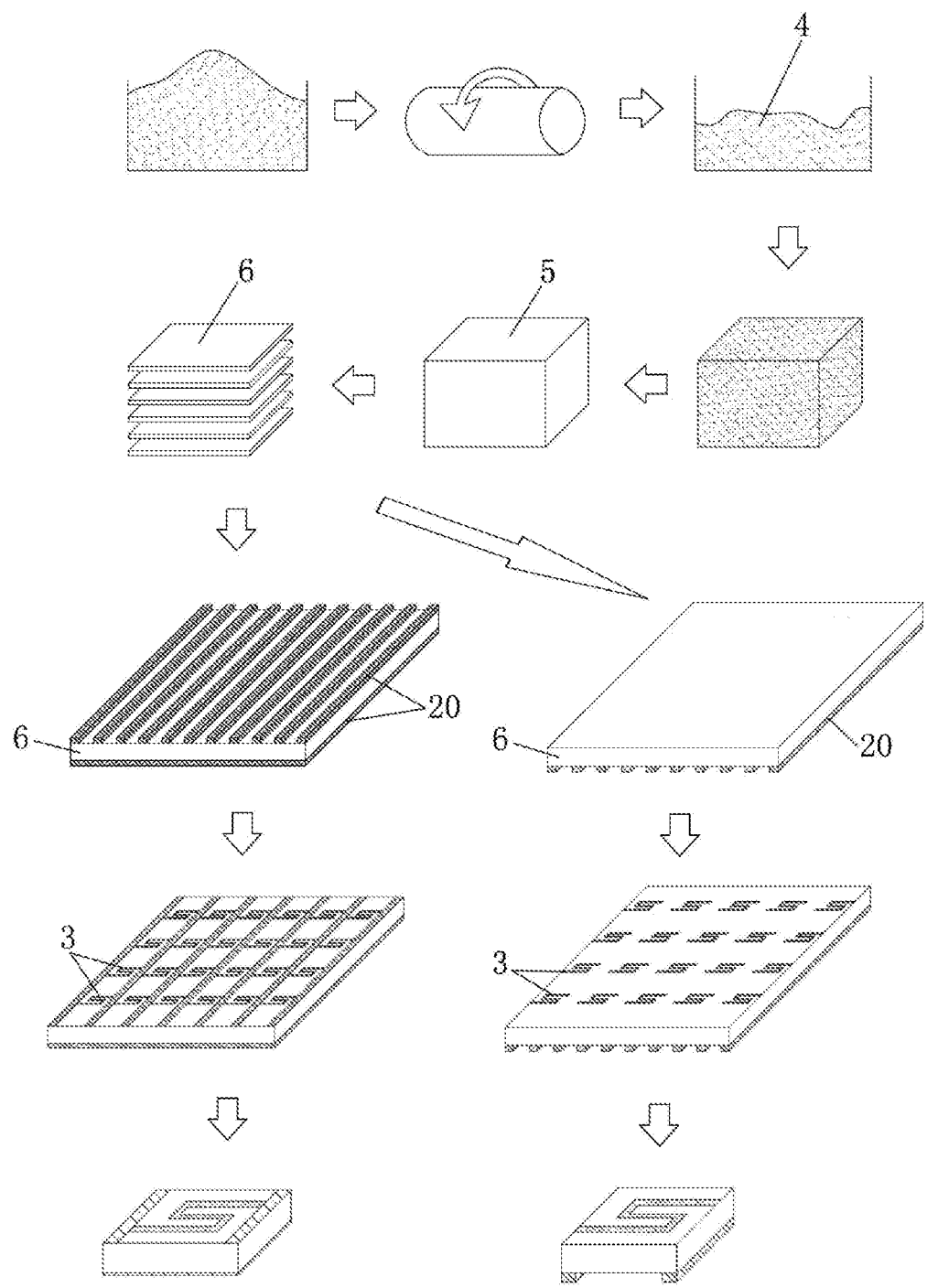
FIG. 7 is a flow diagram of a preparation method in Embodiment 3.

Please refer to FIG. 7 which is a flow diagram of a preparation method in embodiment 3.

In this embodiment, a preparation method of the composite thermistor chip in Embodiment 1 or the composite thermistor chip in Embodiment 3 specifically includes the following steps:

(1) Mixing raw materials according to a conventional NTC thermosensitive ceramic material formula, and then sequentially ball-milling, drying, screening, pre-sintering, grinding, drying and screening the raw materials to prepare NTC thermosensitive ceramic powder 4 for later use;

(2) Loosely placing the prepared NTC thermosensitive ceramic powder 4 into a rubber mold, then compacting the NTC thermosensitive ceramic powder 4, and afterwards, placing the rubber mold in an isostatic press to press the NTC thermosensitive ceramic powder 4 under a pressure of 200-400 MPa for 10-50 s, taking a formed cuboidceramic ingot 5 out of the mold after pressure relief, then sintering the ceramic ingot 5 at a high temperature to obtain a compact ceramic ingot 5, and afterwards, using an inner diameter slicer to slice the ceramic ingot 5 in terms of a set thickness to obtain a thermosensitive ceramic substrate 6;

(3) Printing silver pastes on a surface of the thermosensitive ceramic substrate 6, and drying the silver pastes to obtain a silver metal electrode layer 20 printed on the thermosensitive ceramic substrate 6;

Specifically, when the composite thermistor chip in Embodiment 1 is prepared, a plurality of parallel terminal electrodes are printed on a front side of the thermosensitive ceramic substrate 6, and an electrode layer is printed on a whole back side of the thermosensitive ceramic substrate 6; or when the composite thermistor chip in Embodiment 2 is prepared, a plurality of parallel terminal electrodes are printed on the back side of the thermosensitive ceramic substrate 6;

(4) Printing glass glaze resistor pastes on the surface of the thermosensitive ceramic substrate 6 in a form that can be adjusted according to a desired resistance and the area of the thermosensitive ceramic substrate 6; and conducting sintering at a high temperature of 840V for 10-30 min after the glass glaze resistor pastes are dried to obtain a plurality of glass glaze resistors 3 printed on the thermosensitive ceramic substrate 6;

Specifically, when the composite thermistor chip in Embodiment 1 is prepared, the glass glaze resistors 3 are printed on the front side of the thermosensitive ceramic substrate 6 and arrayed in a matrix manner, and two ends of each glass glaze resistor 3 are respectively connected to two adjacent terminal electrodes; or when the composite thermistor chip in Embodiment 2 is prepared, the glass glaze resistors are printed on the front side of the thermosensitive ceramic substrate 6 and arrayed in a matrix manner;

(5) Conducting laser resistance trimming on the glass glaze resistors 3 to improve resistance precision, and then dividing the thermosensitive ceramic substrate 6 to obtain single composite thermistor chips, wherein:

the thermosensitive ceramic substrate 6 is divided into thermosensitive ceramic chips 1, the metal electrode layer 20 is divided into metal electrodes 2, and each composite thermistor chip includes one glass glaze resistor 3.

The resistant-temperature curves (RT curves) of the composite thermistor chip in Embodiment 1, the composite thermistor chip in Embodiment 2, and the conventional thermistor chip are obtained by testing. The conventional thermistor chip is made from an NTC thermosensitive ceramic material having a material constant of B(25/85) =3435K, and the composite thermistor chip in Embodiment 1, the composite thermistor chip in Embodiment 2 and the conventional thermistor chip are identical in specification and size.

Figure 8:
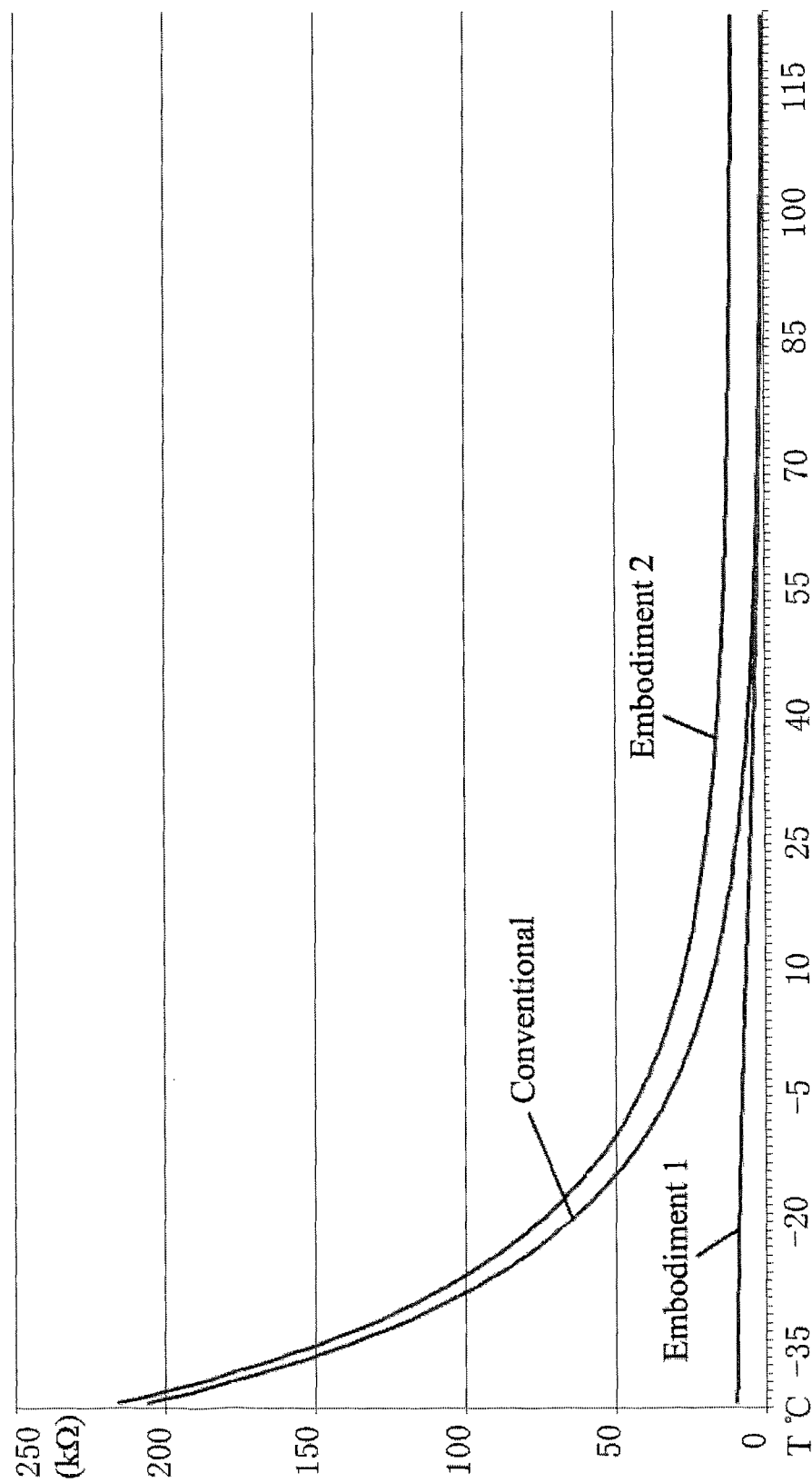
FIG. 8 is a comparison diagram of the resistance-temperature curves of the composite thermistor chip in Embodiment 1, the composite thermistor chip in Embodiment 2, and the conventional thermistor chip.

As shown in FIG. 8, the RT curves of the composite thermistor chip in Embodiment 1 and the composite thermistor chip in Embodiment 2 are different and deviate from the RT curve of the conventional thermistor chip, which means that a new temperature curve can be formed by disposing the glass glaze resistors 3 at different positions, and accordingly, thermistors having different applications and functions are obtained.

The embodiments which are specifically detailed above are only several illustrative ones of the invention and should not be regarded as restrictive to the patent scope of the invention. It should be noted that various transformations and improvements achieved by those ordinarily skilled in this field without deviating from the concept of the invention also fall within the protection scope of the invention.

What is claimed:

1. A composite thermistor chip, comprising a thermosensitive ceramic chip, a metal electrode and a glass glaze resistor; the thermosensitive ceramic chip has a front side and a back side; the metal electrode comprises a first terminal electrode, a second terminal electrode and a third electrode layer; the first terminal electrode and the second terminal electrode are respectively arranged at two ends of the front side of the thermosensitive ceramic chip; the glass glaze electrode is arranged on the front side of the thermosensitive ceramic chip, two ends of the glass glaze resistor are respectively connected to the first terminal electrode and the second terminal electrode; and the back side of the thermosensitive ceramic chip is covered with the third electrode layer.

2. The composite thermistor chip of claim 1, wherein the metal electrode is made from a precious metal.

3. The composite thermistor chip of claim 1, wherein the thermosensitive ceramic chip is made from a negative temperature coefficient thermosensitive ceramic material.

4. The composite thermistor chip of claim 1, wherein the glass glaze resistor is prepared by printing and sintering glass glaze resistor paste on the thermosensitive ceramic chip.

5. A preparation method of the composite thermistor chip of claim 1, comprising following steps:

(1) mixing raw materials according to a conventional negative temperature coefficient thermosensitive ceramic material formula, and then sequentially ball-milling, drying, screening, pre-sintering, grinding, drying and screening the raw materials to prepare negative temperature coefficient thermosensitive ceramic powder for later use;

(2) placing the prepared negative temperature coefficient thermosensitive ceramic powder into a mold, placing the mold in an isostatic press to press the negative temperature coefficient thermosensitive ceramic powder, taking a formed ceramic ingot out of the mold after pressure relief, then sintering the ceramic ingot, and afterwards, slicing the ceramic ingot to obtain a thermosensitive ceramic substrate;

(3) printing a metal electrode layer on a surface of the thermosensitive ceramic substrate;

(4) printing glass glaze resistor pastes on the surface of the thermosensitive ceramic substrate, and conducting sintering after the glass glaze resistor pastes are dried to obtain glass glaze resistors printed on the thermosensitive ceramic substrate; and (5) conducting laser resistance trimming on the glass glaze resistors, and then dividing the thermosensitive ceramic substrate to obtain single composite thermistor chips.

6. The preparation method of claim 5, wherein in step (2), the negative temperature coefficient thermosensitive ceramic powder is pressed in the isostatic press at a pressure of 200-400 MPa for 10-50 s.

7. The preparation method of claim 5, wherein in step (4), sintering is conducted at a temperature of 800-900° C. for 10-30 min.

\* \* \* \* \*